(12) United States Patent
Fuhrmann et al.

(10) Patent No.: US 7,583,692 B2
(45) Date of Patent: Sep. 1, 2009

(54) COMMUNICATIONS NETWORK AND METHOD OF CONTROLLING THE COMMUNICATION NETWORK

(75) Inventors: Peter Fuhrmann, Aachen (DE); Manfred Zinke, Aachen (DE)

(73) Assignee: NXP B.V., Eindhoven (NL)

( * ) Notice: Subject to any disclaimer, the term of this patent is extended or adjusted under 35 U.S.C. 154(b) by 1425 days.

(21) Appl. No.: 10/236,179

(22) Filed: Sep. 6, 2002

(65) Prior Publication Data
US 2003/0067873 A1    Apr. 10, 2003

(30) Foreign Application Priority Data
Sep. 7, 2001   (DE) ............................... 101 44 070

(51) Int. Cl.
*H04L 12/43*   (2006.01)
(52) U.S. Cl. .................. 370/458; 370/257; 370/376; 370/314
(58) Field of Classification Search .............. 370/230, 370/461, 462, 458, 503, 518
See application file for complete search history.

(56) References Cited

U.S. PATENT DOCUMENTS

| | | | | |
|---|---|---|---|---|
| 4,866,606 | A * | 9/1989 | Kopetz | 713/375 |
| 5,402,394 | A * | 3/1995 | Turski | 368/10 |
| 5,481,573 | A * | 1/1996 | Jacobowitz et al. | 375/356 |
| 5,694,542 | A * | 12/1997 | Kopetz | 714/49 |
| 5,784,547 | A * | 7/1998 | Dittmar et al. | 714/4 |
| 6,133,750 | A * | 10/2000 | Chan et al. | 326/41 |
| 6,550,017 | B1 * | 4/2003 | Moiin et al. | 714/4 |
| 7,124,316 | B2 * | 10/2006 | Kopetz et al. | 714/2 |
| 7,171,579 | B2 * | 1/2007 | Weigl et al. | 713/600 |

FOREIGN PATENT DOCUMENTS

EP    1280024 A1 *   1/2003

OTHER PUBLICATIONS

Christopher Temple, "Avoiding the Babbling-Idiot Failure in a Time_triggered Communication System", Institut fur Technische Informatik Technische Universitat Wien, Treitstr. 3/182/1, A-1040 Vienna, Austria, pp. 1-10.*

(Continued)

*Primary Examiner*—Ricky Ngo
*Assistant Examiner*—Dewanda Samuel (57) ABSTRACT

The invention relates to a communications network with at least two network nodes, between which data may be transmitted via a transmission medium,
  in which a communications schedule is provided which allots time slots to the network nodes for access to the transmission medium,
  in which the network nodes each comprise at least one communication controller with a first scheduler for controlling access by the network nodes to the transmission medium according to the communications schedule,
  in which the communications network comprises at least one bus guardian with a second scheduler for monitoring accesses by the network nodes to the transmission medium according to a monitoring schedule,
  in which the communication controller comprises means for generating a local, independent clock signal and a global clock signal, which may be influenced by at least one parameter of the communications system and
  in which the global clock signal is provided both to control the first schedulers of the communication controllers and to control the second scheduler of the bus guardian.

12 Claims, 6 Drawing Sheets

OTHER PUBLICATIONS

Christopher Temple, "Avoiding the Babbling-Idiot Faliure in a Time-Triggered Communication Sytem", Institut fur Technische Informatik Technishe Universitat Wien, Treitlstr 3/182/1 A-1040 Vienna Austria, 1998 pp. 1-10.*

Ramanathan et al. "Fault-Tolerant Clock Synchronization in Distributed Systems", 1990, IEEE, pp. 33-42.*

Kopetz, H.; A Comparison of CAN and TTP: Technische Universitat Wilen; pp. 1-12.*

Kopetz et al.; "A Synchronizartion Strategy for a Time-Triggered Multiclustered Real-Time System"; 2001; pp. 1-8.*

Fuhrer et al.; "Time-triggered Communication on CAN"; VMEbus Systems pp. 1-9.*

Kopetz; "A Comparison of TTP/C and FlexRay"; 2001; TU Wien Report; pp. 1-22.*

TTP: "Drive by Wire" in greifbarer Nahe', Dr. Stefan Polenda, Georg Kroiss; "Elektronik", No. 14, 1999, pp. 36 to 43.

* cited by examiner

COMMUNICATIONS NETWORK AND METHOD OF CONTROLLING THE COMMUNICATION NETWORK

The invention relates to a communications network and a method of controlling the communications network. Such a communications network is known for example from TTP: "*Drive by Wire" in greifbarer Nähe*', Dr. Stefan Polenda, Georg Kroiss; "Elektronik", No. 14, 1999, pages 36 to 43.

For such distributed real-time computer systems, as used for example in the automobile industry, time-triggered communications protocols such as TTP or FlexRay have become generally accepted. The media access protocol is then based on a static communications schedule, which is determined beforehand at the time of system design. In this schedule, it is determined for each communication node at what time within a communication cycle it may send data.

Due to tolerances at the local clock sources, it is possible for the communications schedules of the various nodes to deviate slightly from one another. So that overlapping does not occur despite these deviations, a gap ("interframe gap") is inserted between the data packets, wherein this gap should naturally be as short as possible in the interests of high efficiency. Through measures aiming at global clock synchronization in the distributed communication controllers, as used for example with TTP/C, these deviations may be markedly reduced, shorter "interframe gaps" thereby being made possible.

In the case of time-triggered communications protocols, it is particularly important for nodes to send data only at the times determined during scheduling. Without special safeguarding measures, a single defective node (babbling idiot), which transmits constantly at the wrong time, could otherwise block all data traffic. To prevent this, in the case of the stated protocols access to the transmission medium is conventionally safeguarded by a bus guardian. The bus guardian has available to it an independent time base and a scheduler, which allows write access to the medium only during the time slot provided and for short tolerance zones before and after the time slot. If the bus guardian notes that a communication controller is attempting to write to the data bus outside the period of time allotted to it, the bus guardian stops this access, signals a fault situation and permanently blocks further bus access by this communication controller. In this way, the bus guardian ensures the "fail-silent" property of a network node.

Communication controllers and bus guardians are designed to operate as far as possible independently of one another. In the prior art, communication controller and bus guardian operate with independent clock sources and only once per communication cycle is the bus guardian synchronized by the communication controller with the aid of the so-called ARM signal. However, supplying the bus guardian with its own clock results not only in increased costs but also in restrictions to system design and in reduced efficiency, since the "interframe gaps" have to be so dimensioned that overlapping of time slots due to clock frequency deviations does not occur even after many years.

It is an object of the invention to provide a communications network which avoids the above disadvantages.

This object is achieved according to the invention by a communications network with at least two network nodes, between which data may be transmitted via a transmission medium, in which a communications schedule is provided which allots time slots to the network nodes for access to the transmission medium, in which the network nodes each comprise at least one communication controller with a first scheduler for controlling access by the network nodes to the transmission medium according to the communications schedule, in which the communications network comprises at least one bus guardian with a second scheduler for monitoring accesses by the network nodes to the transmission medium according to a monitoring schedule, in which the communication controller comprises means for generating a local, independent clock signal and a global clock signal, which may be influenced by at least one parameter of the communications system and in which the global clock signal is provided both to control the first schedulers of the communication controllers and to control the second scheduler of the bus guardian.

The field of use of the invention relates to distributed communications systems, in which access to the transmission medium proceeds according to a cyclic time division method (TDMA) and in which a bus guardian monitors the communications schedules of one or more network nodes and allows media accesses as a function of a predefined communications schedule.

The bus guardian is synchronized by means of a global clock signal, which the communication controller makes available. The global clock signal may be influenced by at least one parameter of the communications system. The global clock signal may for example follow the corrections necessary for global clock synchronization of the communication controllers. This may proceed for example in that the global clock signals of the individual communication controllers are adjusted to one another or in relation to an external reference signal. A second local clock signal is independent of these corrections and is derived statically for example from a quartz oscillator of the communication controller.

The local clock signal may preferably be used for monitoring the global clock signal.

In addition to solutions in which each of the distributed nodes has its own bus guardian, in the case of star-type networks, solutions are also possible which have a central bus guardian, wherein the central bus guardian monitors the communication of all the nodes connected to the star coupler.

The method proposed in this invention allows time monitoring of the communication controller without the above-described disadvantages, by performing continuous synchronization of the bus guardian with the global clock signal of the communication controller. The bus guardian may then profit from a very precise, long term-stable clock source of the communication controller and from algorithms for global clock synchronization of the distributed communication controllers. The quartz oscillator required for the bus guardian in conventional solutions may be dispensed with. To compensate for the greater dependence of the communication controller, monitoring of the clock signals delivered by the communication controller takes place in the bus guardian by means of suitable "watchdog" circuits. The local clock signal of the communication controller may in this case preferably be used to monitor the global clock signal of the communication controller.

In distributed real-time computer systems, which operate with time-triggered communications protocols, a common notion of time must be ensured in the individual communication controllers despite the time tolerances due to local independent clock sources. This may be achieved for example by using temperature-controlled long-term-stable quartz oscillators. Under unfavorable environmental conditions and in the case of maintenance-free operating periods of several years, as need to be taken into account for example in applications in the automobile sector, the necessary tight tolerances cannot be complied with. In order to ensure, even under these conditions, that data packet superpositioning does not occur on the transmission medium, relatively large gaps are required between the data packets. One of the reasons for these large gaps is that, in currently conventional systems, the communication controllers are synchronized only once at the beginning of each communication cycle. As the communication cycle continues, even small deviations may then add up in such a way that only with relatively long "interframe gaps" is fault-free communication possible. However, long "interframe gaps" result in low data transmission efficiency, in particular in systems with relatively small packet length, as for example in automobile technology.

The idea on which this invention is based is continuous synchronization of the bus guardian with the global clock signal of the communication controller. This synchronization makes it possible to protect the data bus with tight time tolerances from unauthorized write accesses, without the bus guardian requiring therefore clock oscillators with low tolerances and high long-term stability. For this, use is made of the fact that, in the communication controller, an internal clock signal is generally already available for use as a global clock signal which has experienced all the corrections for global clock synchronization. In the case of the protocols under consideration here, this internal clock is also known as a macrotick. All the bus accesses of the node proceed with the resolution of this macrotick, which is as a rule markedly less than the period duration of the actual clock signal and should correspond to a certain degree to the system accuracy. This means that the length of data packets or gaps is defined in macroticks. The known methods for global clock synchronization are based on correcting the period duration of this macrotick in such a way that, despite deviating clock frequency, the predetermined time multiplex scheme on the bus is complied with tight tolerances.

This macrotick signal is used together with a further clock signal derived directly and without correction from the clock of the communication controller, the so-called BG tick (bus guardian tick), to operate the bus guardian. The clock oscillator of the bus guardian, for which according to the present prior art a long-term-stable quartz oscillator would be necessary, may be wholly dispensed with. Only for monitoring by a "watchdog" the local clock signal generated by the communication controller is an oscillator needed with very low requirements as regards clock frequency precision. This may be an RC oscillator for example, which has considerable cost advantages and simplifies later integration into a bus guardian taking the form of an integrated circuit.

By synchronizing the bus guardian with the global clock signal of the communication controller, an algorithm executed on this communication controller for global clock synchronization also has an effect on the bus guardian. By this close coupling, bus accesses may be monitored with very tight time tolerances despite relatively large tolerances of the clock oscillator for the communication controller. The efficiency of the communications protocol is thus no longer determined by the requirements of the bus guardian, but rather, as desired, by the accuracy of the clock oscillator for the communication controller and the algorithms for global clock synchronization.

The independence of the bus guardian with regard to the time multiplex scheme remains, but this scheme is not achieved by means of a clock oscillator local to the bus guardian. However, the close coupling between communication controller and bus guardian causes greater dependence of the bus guardian on the functional reliability of the communication controller.

By means of suitable monitoring circuits for the global and local clock signals of the communication controllers, it may be ensured that media accesses outside the communications schedule are stopped. Such faulty accesses could arise as a result of configuration errors, errors in global clock synchronization, in the event of relatively large clock frequency deviations or in the event of complete failure of one of the clock signals. In these instances, the bus access is reliably blocked and thus the fail-silent property of the communication controller is ensured.

In a preferred embodiment, the period duration of the global clock signal influenced by the global clock synchronization is tested by means of a watchdog circuit. The local, independent clock signal of the communication controller is used as a reference signal. The duration of this testing may amount to one or more periods of the global clock signal influenced by the global clock synchronization.

Testing of the global clock signal influenced by the global clock synchronization may be deactivated for a configurable part of the communication cycle, if this is necessary for the quickest possible corrections of the global clock time.

In addition, the duration of a communication cycle may be tested in the bus guardian to safeguard against errors in scheduling or in the clock generation of the communication controller. A synchronization signal (ARM) may be used, which indicates the start of a communication cycle.

Failure and gross frequency deviations of the independent local clock signal are preferably likewise monitored by means of a watchdog circuit. A local clock generator of the bus guardian is used as a reference, which may also take the form of an RC oscillator due to low accuracy requirements.

A further watchdog circuit may be used to detect a failure of the local clock generator of the bus guardian, wherein the time constant of a monostable flip-flop (analog circuit) may be used as a reference, for example.

The faults detected by the watchdog circuits cause the bus guardian to stop media accesses and output an error message to the higher level host controller.

In order to avoid undesired error messages during network startup, the functioning of all watchdog circuits may be suppressed until a node indicates for the first time the start of a communication cycle (ARM signal).

The invention will be further described with reference to examples of embodiment shown in the drawings, to which, however, the invention is not restricted.

Figure 1:
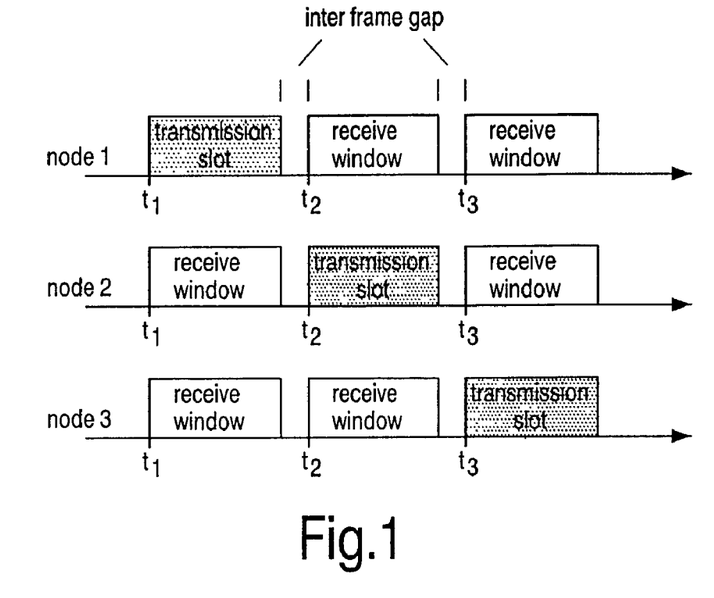

FIG. 1 shows a simplified example of the communications schedule of a communications network with the three network nodes 1, 2 and 3, wherein the three network nodes may only send at the set times t1, t2 and t3.

Figure 2:
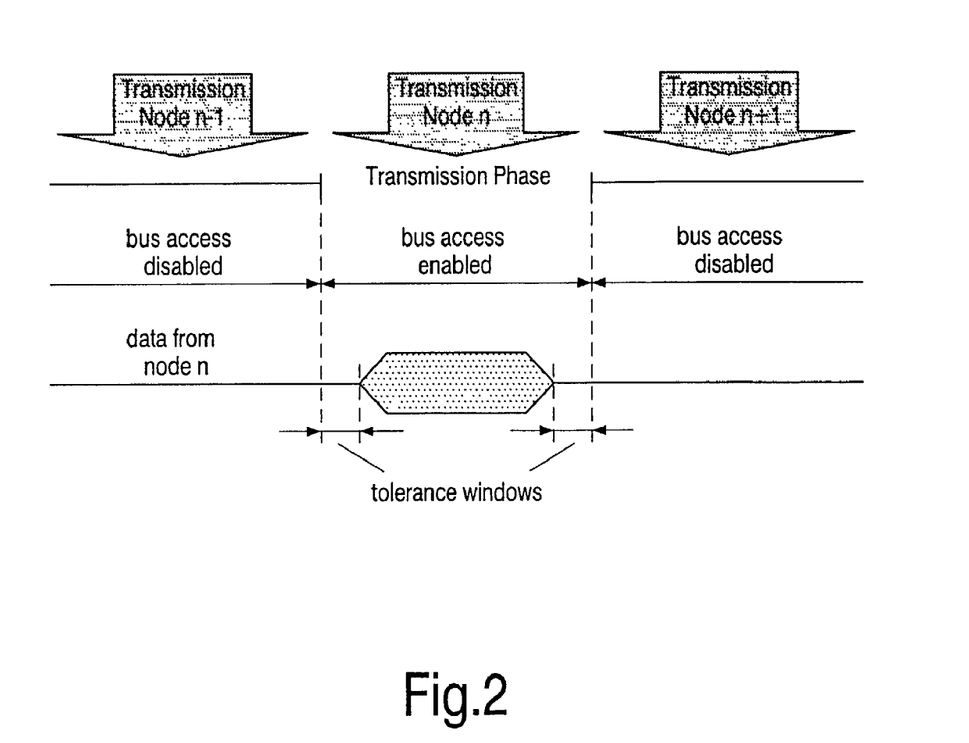

FIG. 2 shows the relationship between the communications schedule of a communication controller and the monitoring schedule of an associated bus guardian. The bottom row shows the time interval for the node n which is allotted to the node n for transmission according to the communications schedule. The enable times of the bus guardian are shown thereabove. The bus guardian is enabled somewhat earlier and disabled somewhat later, each time offset by one tolerance window.

Figure 3:
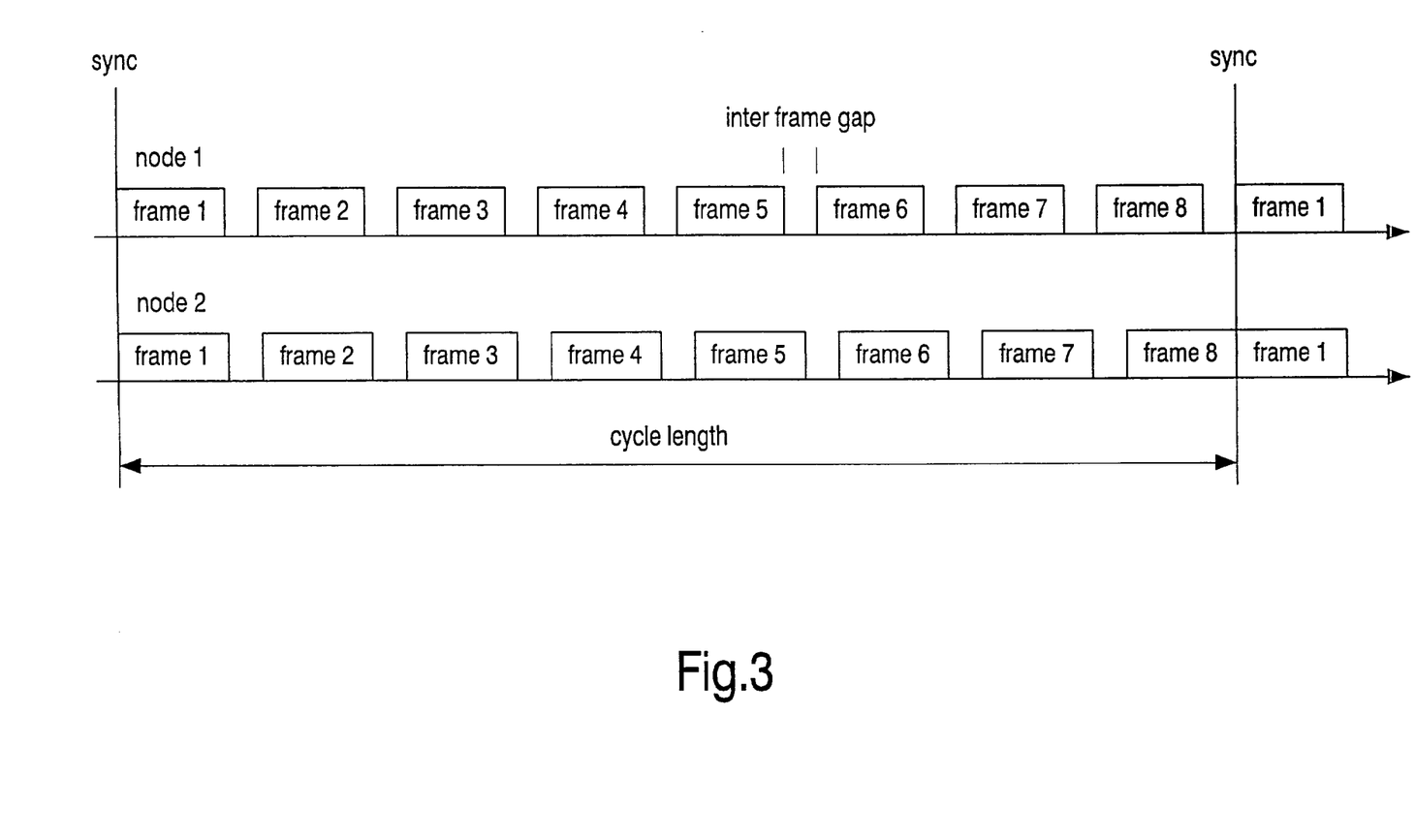

FIG. 3 shows a simplified time multiplex scheme with two communication nodes and a communication cycle, which consists of 8 data packets (frames). This example shows that the send times of the two nodes may drift in such a way, due to local clock source tolerances, that at the end of the communication cycle there is a risk of collision. In this example, the collisions are prevented by sufficiently long "interframe gaps". It will be noted that all the nodes are synchronized only once at the start of each communication cycle by the reception of a special symbol and ever greater deviations thereby occur as cycle length increases. The length of the "interframe gaps" is established as a constant parameter for the entire duration of the communication cycle and cannot be enlarged dynamically at the end of the cycle. In the case of large cycle lengths, the length needed for the "interframe gap" may considerably impair the efficiency of data transmission, especially if only very short data packets are to be transmitted. To prevent the problems illustrated in the case of synchronism of the distributed communication controllers, methods are therefore frequently used for global clock synchronization by means of which continuous synchronization of the communication controllers is achieved. In this way, short "interframe gaps" and thus high efficiency are achieved and economic solutions are made possible in the case of moderate clock supply accuracy requirements.

A very similar synchronization problem arises between communication controller and the associated bus guardian, since, with today's systems, independent clock sources are used even in this case.

Figure 4:
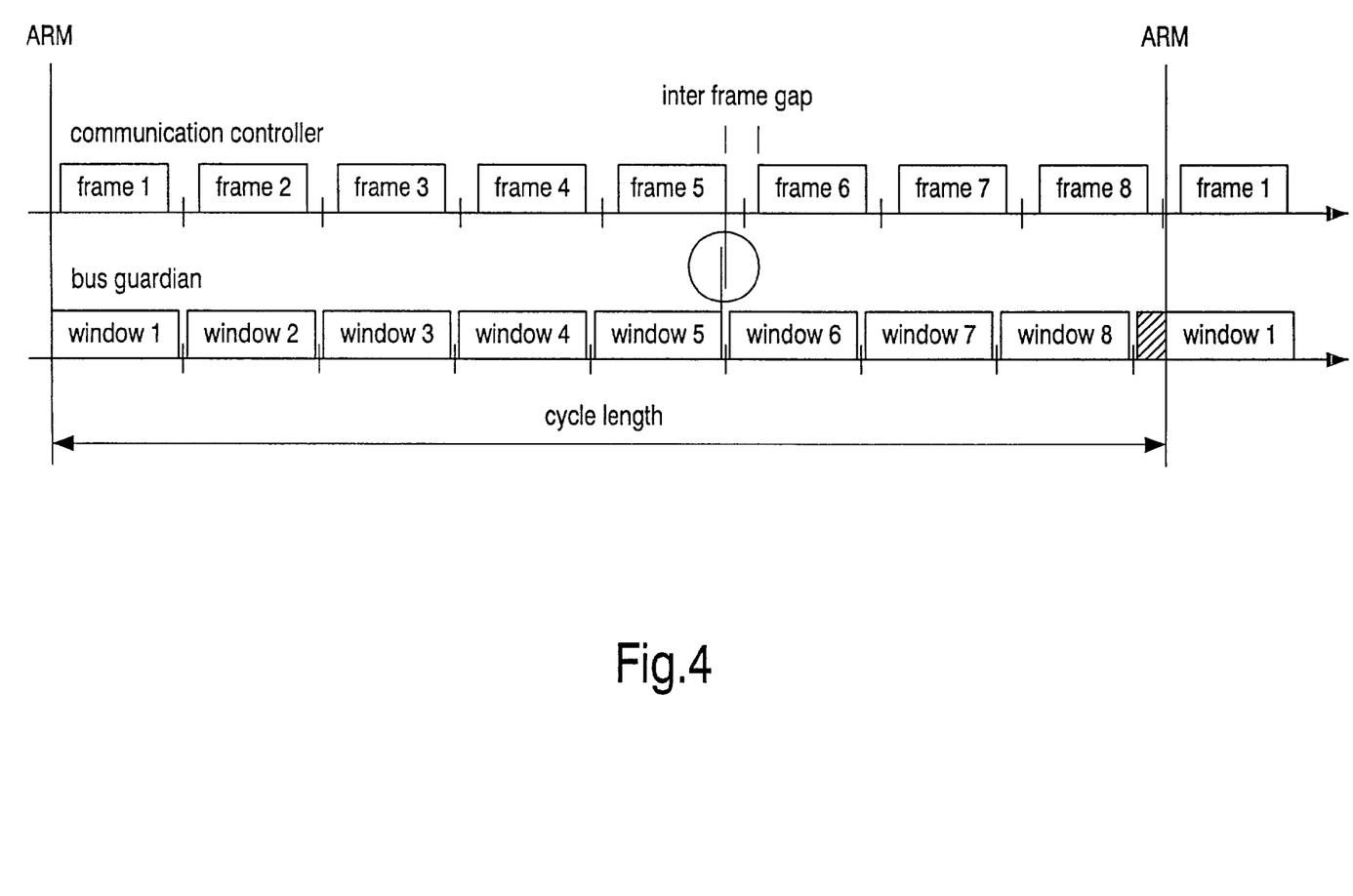

FIG. 4 shows an example of a network node in which the bus guardian drifts away during the course of a communication cycle due to deviating clock frequency. The "interframe gaps" will be noted between the data packets of the communication controller and the enable times of the bus guardian, enlarged by the tolerance windows. In the example, although the bus guardian displays correct time behavior at the start of the communication cycle, it deviates ever more strongly from the send times of the communication controller in the second half of the cycle. From the fifth data packet onwards, parts of the data packets are even cut off due to premature disabling of the bus guardian. This could only be remedied here by enlarging the "interframe gaps".

The accuracy with which the bus accesses may occur, and thus the necessary length of the "interframe gaps" does not result, for the stated reasons, from the accuracy of the communication controllers improved by global clock synchronization but rather it is limited ultimately by the accuracy of the clock sources for the bus guardians.

Figure 5:
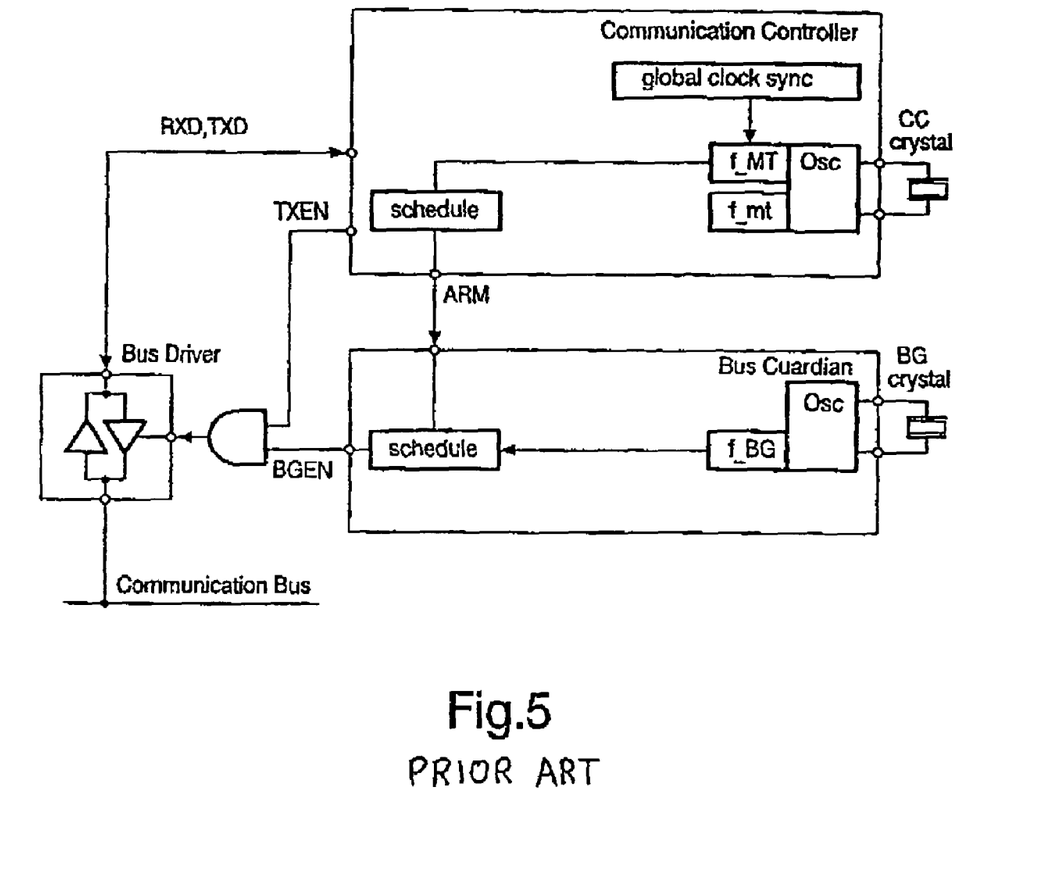

FIG. 5 shows the basic structure of a bus guardian and its connection to a communication controller according to the prior art. The bus guardian is conventionally synchronized only once at the start of the communication cycle by the communication controller via the ARM signal and then runs freely with the accuracy of its own clock oscillator until the end of the cycle. This means that clock deviations between communication controller and bus guardian up to the end of the communication cycle may possibly add up in such a way that the bus guardian can no longer perform its task in fault-free manner. Although global clock synchronization may ensure that all the communication controllers have a common notion of time, it has no influence on the bus guardians, since these have their own clock oscillators for reasons of independence. The clock frequency thereof is subject, however, to the same fluctuations and long-term effects which already made long "interframe gaps" necessary in the case of synchronization of the communication controllers. An additional global clock synchronization for the bus guardians is not feasible for reasons of cost, in particular since the bus guardians are not conventionally provided with a processor.

Figure 6:
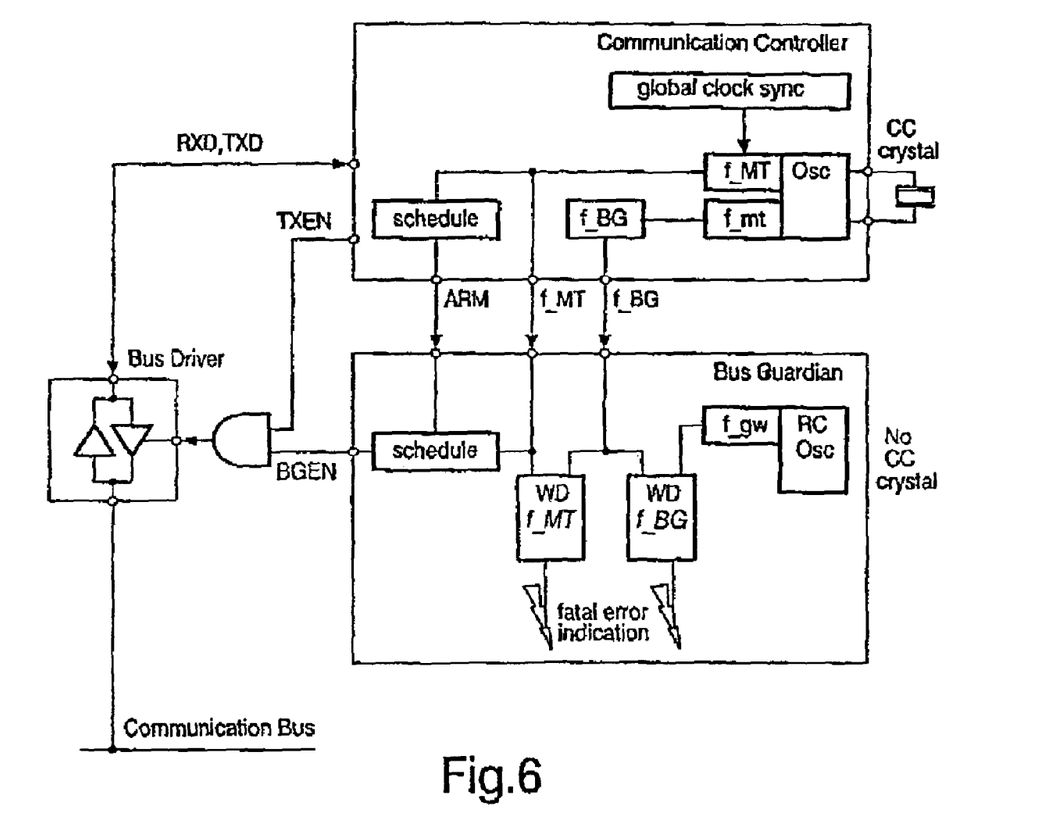

FIG. 6 shows a portion of a communications network according to the invention with a communication controller and a bus guardian, which are implemented in a node of the network and control access by the node to a data bus of the network.

The communication controller generates a global clock signal f_MT and a local clock signal f_mt.

The scheduler of the bus guardian controls the bus accesses on the basis of the global clock signal (macrotick) f_MT. The two watchdog circuits $WD_{f\_MT}$ for monitoring the macrotick and $WD_{f\_BG}$ for monitoring the BG tick have been added and in this example an integrated RC oscillator is used instead of the otherwise usual quartz oscillator.

The bus guardian is continuously synchronized with the internal clock time of the associated communication controller, wherein this clock time is typically represented by the so-called macrotick. The macrotick is generated from the signal of the clock oscillator in the communication controller by a digital divider, whose divider ratio may be so controlled, by means of the algorithm for global synchronization, that the communication controller even complies with the correct time multiplex scheme in the event of clock frequency deviations. If the scheduler in the bus guardian is then also clocked with this macrotick, it follows the variations in the period duration of the macrotick introduced for clock synchronization. By means of this continuous synchronization between communication controller and bus guardian, very narrow tolerance zones for the enable times of the bus guardian are made possible and thus also short "interframe gaps".

Through synchronization, the bus guardian may do without its own precise clock oscillator. However, a clock signal is required in addition to the macrotick as replacement for the hitherto used local clock oscillator of the bus guardian. This so-called BG tick is derived directly from the clock oscillator of the communication controller by a frequency divider and is thus independent of global clock synchronization.

The BG tick determines the maximum resolution with which the bus guardian may control enabling and disabling of bus access. In addition to its use as a fine resolution clock, the BG tick is additionally required for testing, by means of a watchdog circuit, whether the period duration of the macrotick lies within set tolerances. These limits are established during configuration of the system and have to be so dimensioned that permissible deviations, such as caused by clock synchronization for example, are tolerated. If the period duration of the macrotick lies outside the tolerances or if the signal fails completely, the bus guardian must block bus accesses. To increase monitoring precision, a configurable number of periods may also be monitored instead of a macrotick period. Depending on requirements, monitoring may thus cover the entire cycle length. In addition, monitoring of the cycle length is possible if a watchdog circuit determines the number of BG ticks between two consecutive ARM signals.

It is possible for the corrections necessary for global clock synchronization not to be distributed evenly over a communication cycle but rather to have to take place within a predetermined period, for example within a few macroticks of the start of the communication cycle. The period duration of the macrotick would have to be changed considerably for these few periods, so meaning that the watchdog circuit tolerances then necessary would not allow precise monitoring of the macrotick. To prevent this, checking of the macrotick may be deactivated for a configurable part of the communication cycle.

A further watchdog circuit safeguards against failure or a deviating frequency of the BG tick signal itself. This tests in a similar manner the period duration of the BG tick signal and thus indirectly also that of the clock oscillator in the communication controller. A clock oscillator with relatively large tolerances is here suitable as a reference oscillator, since at this point only gross deviations from the nominal period duration have to be detected. Small deviations from nominal frequency are generally detected by means of the algorithms for global clock synchronization in the communication controller. To save on costs and for the purpose of simple integration, an RC oscillator may be used at this point.

Alternatively, the bus guardian illustrated in FIG. 6 may also be associated with a plurality of network nodes and control access by a plurality of network nodes. This is advantageous particularly in the case of star-type networks.

Figure 7:
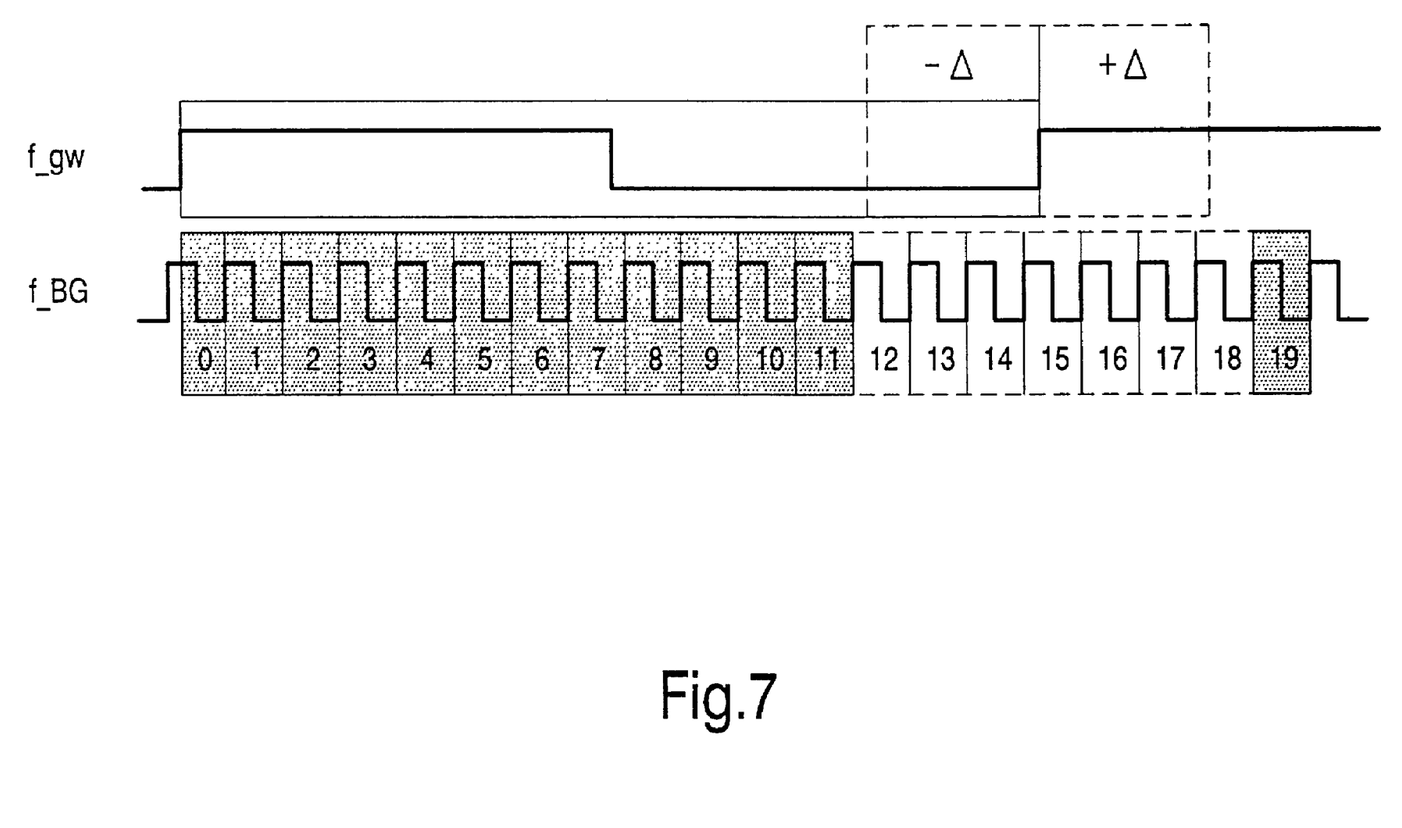

FIG. 7 shows the basic method of operation of the watchdog circuit $WD_{f\_BG}$ for monitoring the BG tick. The signal f_gw is obtained by frequency division from the clock signal of the RC oscillator. By means of this signal, a gate time is defined and the number of clock periods of the BG-tick signal f_BG is determined within this gate time. By comparing the counter result with the window defined by the tolerance zones $-\Delta$ and $+\Delta$, an error is signaled in the event of excessive deviation and bus access is immediately blocked. The second bus guardian $WD_{f\_MT}$ is similarly constructed, except that the gate time corresponds to the period duration of the macrotick and the number of BG-ticks is counted. When the watchdog circuits are put into practice, it must be ensured that the bus guardian responds to failure of the RC oscillator and the signals f_MT and f_BG of the communication controller in the shortest possible time by blocking bus access, in order to ensure the fail-silent property of the node even in the event of a fault.

The invention claimed is:

1. A communications network comprising: at least two network nodes, between which data can be transmitted via a transmission medium; a communications schedule for allotting time slots to the network nodes for access to the transmission medium,
   wherein the network nodes each comprises at least one communication controller with a first scheduler for controlling access by the network nodes to the communications schedule; and
   at least one bus guardian with a second scheduler for monitoring accesses by the network nodes to the transmission medium according to a monitoring schedule,
   wherein the communication controller comprises means for generating a local, independent clock signal and a global clock signal, which is determined by at least one parameter of the communications system; and
   a divider, wherein the divider receives the local, independent clock signal and divides a frequency of the local, independent clock signal to output a bus guardian tick signal to the bus guardian, wherein the communication controller supplies the global clock signal to the bus guardian, and wherein the bus guardian monitors the global clock signal by means of the bus guardian tick signal, and
   wherein means for providing the global clock signal is provided both to the first schedulers of the communication controllers to clock the first schedulers, and is provided to the second scheduler of the bus guardian to clock the second scheduler of the bus guardian.

2. The communications network as claimed in claim 1, wherein the bus guardian comprises a first monitoring circuit, which monitors the global clock signal of the communication controller by the local clock signal of the communication controllers.

3. The communications network as claimed in claim 1, wherein the bus guardian comprises a bus guardian oscillator, which supplies a local clock signal to a second monitoring circuit, and wherein the second monitoring circuit monitors the local clock signal of the communication controller clock signal to a second monitoring circuit; and wherein the second monitoring circuit monitors the local clock signal of the communication controller by means of the local clock signal of the bus guardian.

4. The communications network as claimed in claim 3, wherein the bus guardian oscillator is an RC oscillator.

5. The communications network as claimed in claim 3, wherein the bus guardian comprises a failure monitoring circuit, which monitors failure of the bus guardian oscillator and in that, in the event of failure of the bus guardian oscillator, the failure monitoring circuit causes blocking of access by the node associated with this bus guardian to the transmission medium or generates an error message.

6. The communications network as claimed in claim 1, wherein an algorithm is implemented in the communication controller of the network, by means of which algorithm the global clock signals of the communication controllers are adjusted to one another or in relation to a reference signal.

7. The communications network as claimed in claim 2, wherein the first monitoring circuit comprises a counter, which determines the number of periods of the local clock signal over one or more periods of the global clock signal; and wherein the first monitoring circuit causes blocking of access by the node associated with the bus guardian or by the nodes associated with the bus guardian to the transmission medium, if the number of counted periods lies outside a predeterminable tolerance zone.

8. The communications network as claimed in claim 3, wherein the second monitoring circuit comprises a counter, which determines the number of periods of the local clock signal of the communication controller over one or more periods of the local clock signal; and wherein the second monitoring circuit causes blocking of access by the node associated with the bus guardian or by the nodes associated with the bus guardian to the transmission medium, if the number of the counted periods lies outside a predeterminable tolerance zone.

9. The communications network as claimed in claim 1, wherein the communication controller comprises a quartz oscillator, in that the local clock signal of the communication controllers is derived by means of a fixed divider from the signal of the quartz oscillator; and wherein the global clock signal of the communication controllers is derived by means of a variable divider from the signal of the quartz oscillator, wherein the divider ratio of the variable divider is determined by at least one parameter of the communication system.

10. A method of controlling a communications network comprising: at least two network nodes, between which data is transmitted via a transmission medium,
   a communication schedule for allotting time slots to the network nodes for access to the transmission medium,
   wherein the network nodes each comprises at least one communication controller with a first scheduler for controlling access by the network nodes to the transmission medium according to the communication schedules; and
   at least one bus guardian with a second scheduler for monitoring accesses by the network nodes to the transmission medium according to a monitoring schedule,
   wherein the communication controller generates a local, independent clock signal and a global clock signal, which determined by at least on parameter of the communications system; and
   wherein the global clock signal is provided to both the first schedulers of the communication controllers to clock the first schedulers and is provided to the second scheduler of the bus guardian to clock the second scheduler of the bus guardian, wherein the second scheduler receives the global clock signal from the communication controller; and receiving a synchronization signal form the communication controller to indicate the start of a communication cycle.

11. The network of claim 1, wherein the communication controller supplies the global clock signal to the second scheduler of the bus guardian, supplying a synchronization signal to the second scheduler to indicate the start of a communication cycle; supplying a bus guardian tick signal to the bus guardian; and wherein the communication controller produces the bus guardian tick signal by frequency dividing the local independent clock signal.

12. The method of claim 10, further comprising, at the bus guardian, monitoring the global clock signal of the communication controller by means of the local, independent clock signal of the communication controller.

* * * * *